Nov. 15, 1927.  
F. A. SCHROEPFER  
1,649,747  
CHALK LINE HOLDER AND CHALKING DEVICE  
Filed May 8, 1926
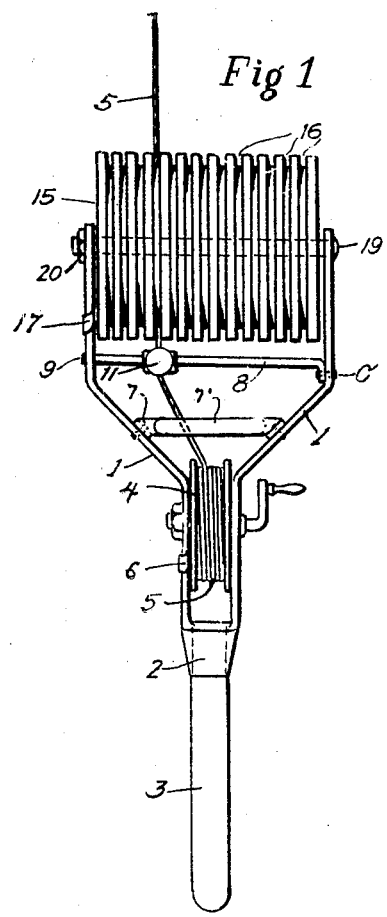
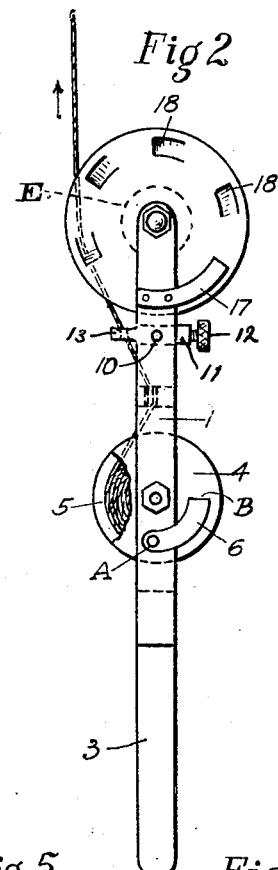
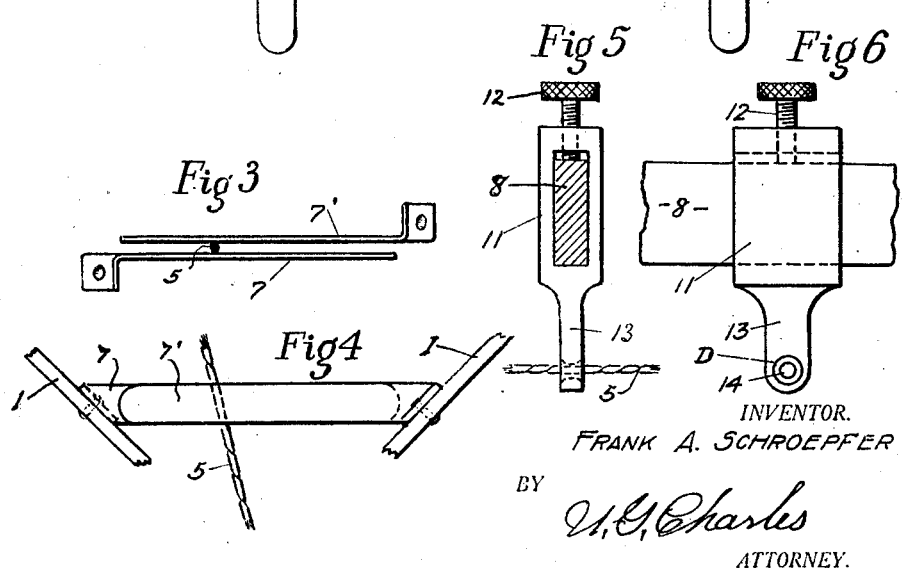
INVENTOR.  
FRANK A. SCHROEPFER  
BY  
U. G. Charles  
ATTORNEY.

Patented Nov. 15, 1927.

1,649,747

UNITED STATES PATENT OFFICE.

FRANK A. SCHROEPFER, OF TOPEKA, KANSAS.

CHALK-LINE HOLDER AND CHALKING DEVICE.

Application filed May 8, 1926. Serial No. 107,693.

My invention relates to a chalk line holder and chalking device.

The object of my invention is to provide a frame having a chalk reel and a chalking drum trunnioned therein in working relation to each other.

A further object of my invention is to conserve the chalk.

A still further object of my invention is to provide a reel for the chalk line to preserve and quickly wind the line thereon.

A still further object of my invention is to provide a mechanism having tensioning means for the line.

A still further object of my invention is to provide a mechanism embodying the line and chalking means to avoid dis-placement of either.

A still further object of my invention is to provide a frame separably assembled as convenient means for the removal of the reel, drum, or other parts.

These and other objects will hereinafter be more fully explained.

Referring to the drawings:

Fig. 1 is a plan view of the mechanism.

Fig. 2 is a transverse view of Fig. 1.

Fig. 3 is an enlarged detail view of the line tensioning means.

Fig. 4 is a plan view of Fig. 3.

Fig. 5 is a view of the line guiding means, the bar on which it engages being in section.

Fig. 6 is a transverse view of Fig. 5.

Referring to the drawings in detail, 1 is a bifurcated frame having a socket 2 to receive a handle 3. Trunnioned in the frame is a reel 4 on which is wound the chalk line 5; the said reel being frictionally held by a spring 6 rigidly attached to the frame at A and frictionally engaging the reel at B thus retarding excess rotation while the line is being drawn off the reel. Within the forks of the frame and rigidly attached thereto are parallel tensioning blades 7 and 7'. The line 5 may be entered at either end of the blades and may slide longitudinally therebetween as the position of the guiding means hereinafter described may require.

The blades 7 and 7' conveniently prevent the line from sagging while it is being wound on the reel and the said blades being rigidly attached to their respective sides of the frame are free to move independent of each other when the ends of the frame are sprung apart to remove and replace the chalk drum.

Rigidly attached to one leg of the frame is a bar 8 as at C, the opposite end thereof having a spindle 9 thereon engaging in an aperture 10 for convenience when the legs of the bifurcations are sprung apart.

Slidably engaging on the bar is a block 11, said block having a set screw 12 threadedly engaging therein as fastening means for said block at any desired location longitudinally on the bar. On the opposite end of the block is a tongue 13 having an eye 14 in the outer end thereof; the said eye being funneled on both sides as indicated by circle D. The said eye serves as the guiding means for the line as shown in Figs. 1 and 2.

Trunnioned in the frame is a drum 15 having a plurality of grooves 16 distributed along the periphery thereof and extending inward as indicated by the dotted line E. The said grooves are adapted to receive a chalk substance for the purpose hereinafter described. Rigidly attached to one leg of the frame is a curved spring pawl 17 engaging in detent notches 18 positioned on the end of the drum to prevent rotation when the line is being drawn in the directions indicated by the arrow in Fig. 2.

The drum herein disclosed may be constructed of wood, fiber, or metal, and the grooves may be filled with chalk by mixing it with water or other fluid to a paste-like consistency and forced into the grooves until they are well filled, and when thoroughly dry or hardened the drum is ready for use. The grooves, being slightly larger than the line, serve as means for applying the chalk with practically no loss thereof. The block 11 slidably engaging on the bar serves as means by which the line is brought to engagement with a selected groove.

Such modifications may be employed as lie within the scope of the appended claims.

Having thus described my invention, what I claim as new and desire to secure by Letters Patent is:—

1. In a chalk line holder and chalking device, a bifurcated frame having a handle on one end, a reel trunnioned in the frame adjacent the handle, a grooved drum trunnioned in the other end of the frame, chalk deposit in the grooves of the drum, a plurality of detents on the end of the drum, a spring member attached to the frame functioning as a pawl to engage the detents, a spring member attached to the frame, the outwardly extending ends frictionally to engage the side of the reel thus acting as braking means for said reel, a chalk line wound on the reel, means for guiding and tensioning the line through the grooves of the drum as drawn therethrough in chalking the line.

2. In a chalk line holder and chalking device, a bifurcated frame having a handle on one end, a reel trunnioned on the frame adjacent the handle, a leaf spring attached to the frame so that one end thereof will engage frictionally on the end of the reel functioning as a brake for said reel, a grooved drum trunnioned on the other end of the frame, a plurality of detents on one end of the drum, a leaf spring attached to the frame adjacent the drum so that the free end thereof will engage with the detents, a chalk line wound on the reel, blades attached to the frame adjacent the reel so that the line will frictionally engage therebetween, a bar attached to the frame adjacent the drum, a block slidably engaging along the bar having a tongue integral therewith, an eye in the outer end of the tongue to receive the chalk line as guiding means therefor engaging in a selected groove of the drum, means for binding the block firmly to the bar when aligned with the selected groove of the drum, all as, and for the purpose described.

FRANK A. SCHROEPFER.